(12) United States Patent
Hassan et al.

(10) Patent No.: US 6,471,477 B2
(45) Date of Patent: Oct. 29, 2002

(54) JET ACTUATORS FOR AERODYNAMIC SURFACES

(75) Inventors: Ahmed A. Hassan, Mesa; David B. Domzalski, Gilbert, both of AZ (US)

(73) Assignee: The Boeing Company, Mesa, AZ (US)

( * ) Notice: Subject to any disclaimer, the term of this patent is extended or adjusted under 35 U.S.C. 154(b) by 0 days.

(21) Appl. No.: 09/742,489

(22) Filed: Dec. 22, 2000

(65) Prior Publication Data

US 2002/0081198 A1 Jun. 27, 2002

(51) Int. Cl.$^7$ .............................................. B64C 27/04
(52) U.S. Cl. .................... 416/90 A; 244/130; 244/204; 417/412; 417/427
(58) Field of Search .................. 416/90 A, 91, 416/500, 42, 3, 231 R, 231 B, 232; 415/914; 417/412, 427; 92/92; 244/130, 204, 207

(56) References Cited

U.S. PATENT DOCUMENTS

| | | | | |
|---|---|---|---|---|
| 4,585,397 A | * | 4/1986 | Crawford et al. | 417/63 |
| 5,431,186 A | * | 7/1995 | Blume | 137/516.29 |
| 5,618,363 A | * | 4/1997 | Mullender et al. | 156/62.2 |
| 5,755,408 A | * | 5/1998 | Schmidt et al. | 244/204 |
| 5,803,410 A | * | 9/1998 | Hwang | 244/208 |
| 5,806,808 A | | 9/1998 | O'Neil | 244/213 |
| 5,813,625 A | | 9/1998 | Hassan et al. | 244/17.11 |
| 5,938,404 A | | 8/1999 | Domzalski et al. | 416/91 |
| 5,957,413 A | * | 9/1999 | Glezer et al. | 244/208 |
| 6,092,990 A | | 7/2000 | Hassan et al. | 416/42 |
| 6,109,566 A | | 8/2000 | Miller et al. | 244/207 |

* cited by examiner

*Primary Examiner*—Edward K. Look
*Assistant Examiner*—Richard A. Edgar
(74) *Attorney, Agent, or Firm*—Stout, Uxa, Buyan & Mullins, LLP; Donald E. Stout

(57) ABSTRACT

A jet actuator positioned within a hollow space in an aerodynamic structure for controlling the flow over an aerodynamic surface thereof includes a movable member linearly displaced by a voice coil mechanism and a flexible diaphragm defining a compression chamber open to the exterior of the aerodynamic surface through an orifice. Reciprocal displacement of the movable member changes the shape of the flexible diaphragm to alternately expel fluid (e.g., air) from and pull fluid into the compression chamber through the orifice. The movable member includes a pair of pistons joined by a cross element, one of the pistons being attached to the flexible diaphragm. In one embodiment, the flexible diaphragm comprises a bladder sealed around the orifice. The movable member is desirably made of composite material to reduce its inertia, and at least the piston attached to the flexible diaphragm may be stiffened with a composite laminate structure. Fluid intake to the compression chamber may be increased through the use of a one-way valve located either in the aerodynamic surface, or in the piston. In this regard, multiple flapper valves may surround the orifice in the aerodynamic surface for increased fluid ingestion.

23 Claims, 5 Drawing Sheets

JET ACTUATORS FOR AERODYNAMIC SURFACES

FIELD OF THE INVENTION

This invention relates generally to aerodynamic surfaces and, more particularly, to improved constructions for such aerodynamic surfaces which provide for aerodynamic control.

BACKGROUND OF THE INVENTION

In general, the aerodynamic efficiency of any lifting surface, regardless of the type of vehicle, is dependent on the lift-to-drag ratio of that surface. Numerous schemes are known for controlling aerodynamic surfaces on rotor blades, wings, engine inlets, fan blades, and nozzles. Movable control surfaces placed on these aerodynamic surfaces have included flaps, slats, spoilers, ailerons, elevators, and rudders. Although these control surfaces can mechanically alter the geometry of the original aerodynamic device, they are limited in their ability to respond quickly and efficiently. Furthermore, such mechanical control surfaces may have a number of disadvantages, including added complexity to the aircraft, reduced structural integrity, complicated manufacturing, and compromised radar detectability.

In an attempt to mitigate some of these disadvantages, McDonnell Douglas, now part of Boeing, has successfully incorporated devices known as synthetic jet actuators into various aerodynamic surfaces, for example, helicopter blades. A synthetic jet includes a movable diaphragm positioned within a chamber. Movement of the diaphragm pulses air in and out of the chamber through an orifice. In the context of a wing or blade, the diaphragm is positioned within a hollow portion of the structure and pulses air in and out of one or more orifices in the outer skin. The outer skin may be made "porous" with the wing or blade having a plurality of synthetic jets incorporated therein. See, for example, U.S. Pat. Nos. 5,813,625 and 5,938,404.

In the '404 patent, a voice coil mechanism is used to displace a piston attached around its periphery by a diaphragm. The diaphragm and piston define a hollow chamber within the aerodynamic structure, the space being open through a number of orifices in the skin of the structure. The piston is driven at relatively low frequencies compared to piezoelectric diaphragms. This type of device can be termed a first generation Boeing synthetic jet actuator. Despite providing improvements over mechanically-displaced surfaces, the effectiveness of such devices is limited above relatively low operational frequencies. For example, such synthetic jet actuators suffer performance degradation at oscillation frequencies above 200 Hz, which is at the lower end of the range of operational frequencies in a free stream environment of moderate to high subsonic Mach numbers (e.g., 0.20–0.50).

There is presently a need for an improved system for controlling aerodynamic surfaces at moderate to high subsonic free stream Mach numbers (e.g., 0.20–0.50) that reduces manufacturing complexity and does not compromise radar detectability.

SUMMARY OF THE INVENTION

The present invention provides an improvement to existing electromagnetic synthetic jet actuators that suffer from performance degradation in the form of low-momentum output at high operational frequencies (typically about 200 Hz). The present invention thus enables realization of aerodynamic benefits at moderate to high subsonic free stream Mach numbers (e.g., 0.20–0.50), such as enhancement of aerodynamic lift force and/or reduction of vehicle drag. Moreover, these aerodynamic benefits are realized consistently over a wide range of frequencies. In general, the present jet actuators minimize inertial loads associated with moving components, provide a stiffer piston for compressing a flexible diaphragm so as to minimize elastic losses, and facilitate the ingestion of ambient fluid (e.g., air) by the actuator during the suction portion of the oscillation cycle.

In one embodiment, the present invention provides a jet actuator for control of an aerodynamic structure, the structure including a hollow space adjacent an aerodynamic surface and an orifice opening through the aerodynamic surface adjacent to the hollow space. A substantially rigid movable member fits within the hollow space and includes a pair of pistons connected by an elongated cross element defining an axis. The movable member is substantially symmetric in terms of its mass about a plane extending perpendicularly through the mid-point of the cross element, and the axis extends in a direction that intersects the aerodynamic surface substantially normally so that one of the pistons is an outer piston and the other is an inner piston. Each of a pair of springs couples one of the pistons to one or more fixed points relative to the aerodynamic structure so as to define a point of equilibrium for the movable member along the axis. A bellows within the hollow space is sealed around the orifice to define a compression chamber open to the exterior of the aerodynamic surface, the outer piston being attached to. the bellows. A voice coil mechanism within the hollow space drives the movable member in both directions from its point of equilibrium along the axis and causes the outer piston to alternately compress and expand the bellows, thus expelling fluid from and pulling fluid into the compression chamber through the orifice.

In a preferred embodiment, the pistons are flat and thin relative to the axis so that the movable member is in the shape of a spool. The pistons may be circular or other non-circular shape such as rectangular. The movable member is desirably made substantially of composite materials. For example, the outer piston includes at least one, and preferably multiple layers of uni-directional graphite laminated with a composite honeycomb structure. The springs may comprise a pliable membrane extending between the periphery of each of the pistons and a fixed location within the hollow space. The voice coil mechanism preferably includes a pair of spaced apart magnets each having a through opening, with the cross element extending through the openings and the pistons being located on oppositely-facing sides of the magnets. Each of a pair of electric coils rigidly attaches to one of the pistons facing the adjacent magnets and extends within a cavity in the magnets for movement therewithin. An electric circuit energizes the electric coils to drive the pistons in tandem.

In another embodiment of the present invention, a jet actuator for control of an aerodynamic structure is provided, the aerodynamic structure having an aerodynamic surface and hollow space therewithin. An orifice opens through the aerodynamic surface adjacent the hollow space and a substantially rigid movable member having a piston fits within the hollow space and moves along an axis. A flexible diaphragm provided within the hollow space seals around the orifice to define a compression chamber open to the exterior of the aerodynamic surface. The piston is attached to the flexible diaphragm such that movement of the piston along the axis alternately compresses and expands the chamber. A voice coil mechanism within the hollow space drives the movable member along the axis and causes the piston to alternately compress and expand the compression chamber, thus expelling fluid from and pulling fluid into the chamber through the orifice. A one-way valve opening to the compression chamber permits fluid to be pulled therethrough into the chamber upon. expansion of the chamber, but prevents fluid from being expelled therethrough from the chamber upon compression of the chamber.

In a preferred embodiment, the one-way valve is located in the aerodynamic surface, and preferably a plurality of such valves surround the orifice. Alternatively, the one-way valve is located in the piston. The one-way valve may comprise a flapper valve, such as a plate-like structure anchored along one edge and cantilevered over an opening to the compression chamber. In one embodiment, the plate-like structure is made of a composite material, while in another embodiment the material is stainless-steel. Desirably, each of a plurality of plate-like structures is anchored within a recess formed in an inner face of the aerodynamic surface.

A further understanding of the nature and advantages of the invention will become apparent by reference to the remaining portions of the specification and drawings.

DESCRIPTION OF THE PREFERRED EMBODIMENTS

Figure 1:
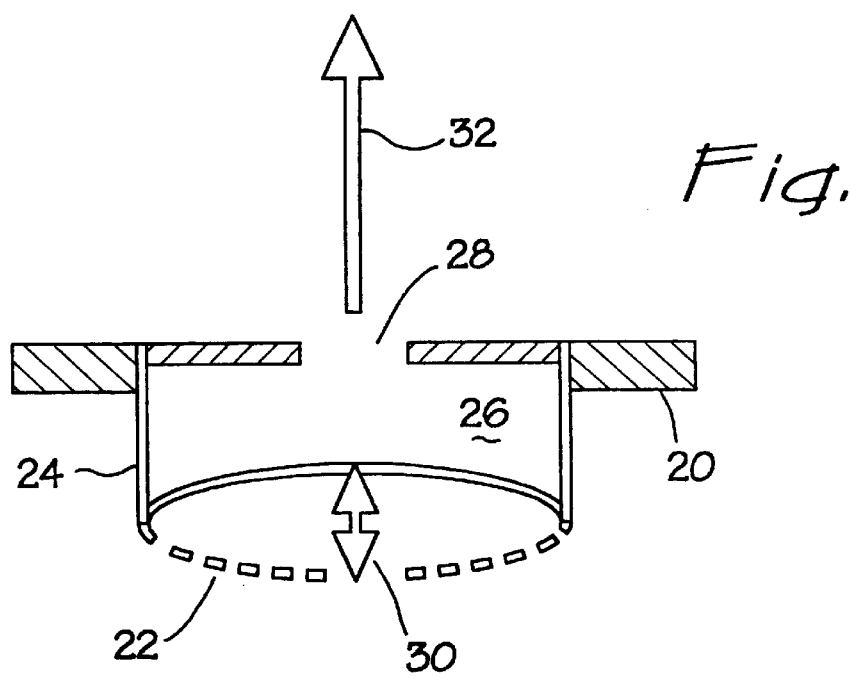
FIG. 1 is a schematic representation of a synthetic jet actuator.

FIG. 1 schematically illustrates the general features of a synthetic jet actuator incorporated into an aerodynamic surface 20. The synthetic jet actuator comprises a vibrating diaphragm 22 spaced from the aerodynamic surface 20 by a circular or rectangular tubular structure 24 to define a cavity 26. The cavity 26 is in communication with the surrounding ambient air through an orifice 28 formed in the aerodynamic surface 20. Oscillatory motion of the diaphragm 22 as indicated by the arrow 30 causes air to pulse in and out of the orifice 28. Outward pulsing of air through the orifice 28 creates a synthetic jet as indicated at 32. Control of the frequency and magnitude of diaphragm oscillation based on free stream conditions can improve performance of the aerodynamic surface 20.

The diaphragm 22 may be activated electrostatically, electromagnetically, hydraulically, pneumatically, or through the use of a piezoelectric material with frequencies that span 1–10 kHz. In U.S. Pat. Nos. 5,813,625 and 5,938,404 the pliable diaphragm 22 is replaced at least at its central region by a rigid piston, with the assembly driven by a voice coil. It should be understood that the present invention may be suitable for various aerodynamic surfaces on rotor blades, wings, engine inlets, fan blades, and nozzles, for example, and that the fluid flowing over the surface may be compressible (e.g., air) or incompressible (e.g., water).

Figure 2:
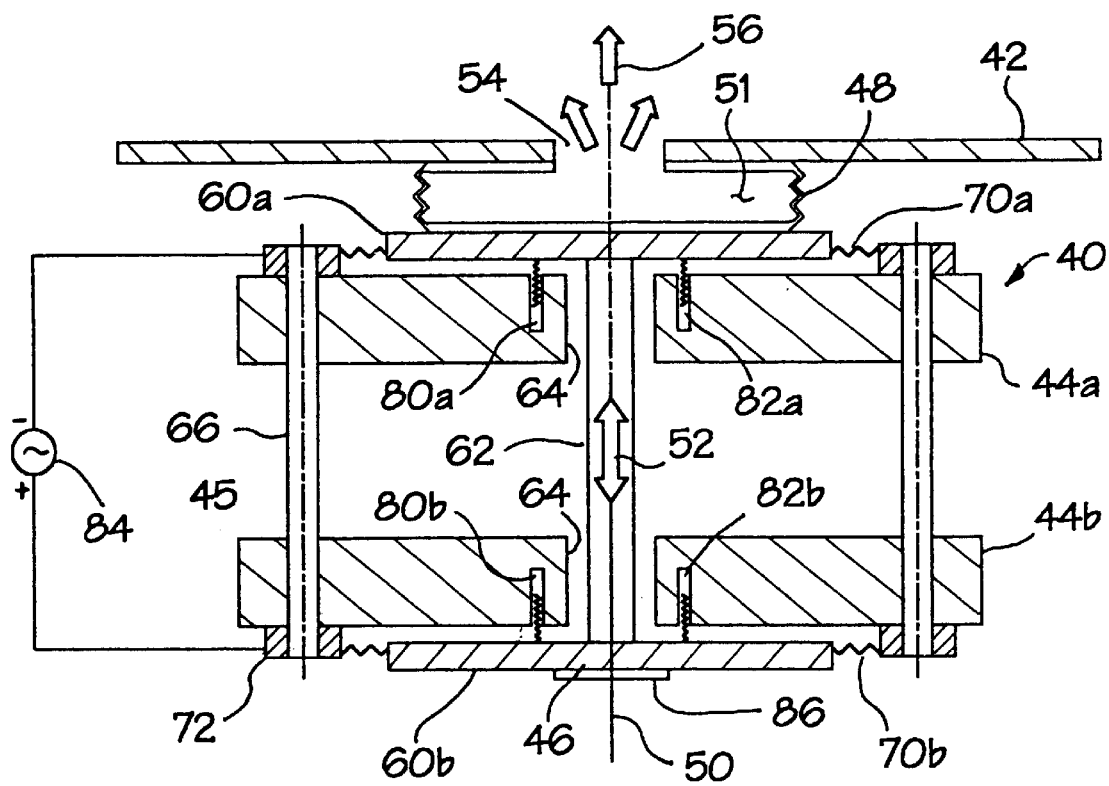
FIG. 2 is a sectional view through a jet actuator of the present invention incorporated into an aerodynamic structure.

FIG. 2 is a cross sectional view of a synthetic jet actuator 40 of the present invention incorporated into an aerodynamic structure, here represented by its outer aerodynamic surface 42. The jet actuator 40 includes a pair of annular permanent magnets 44a, 44b spaced apart across a gap 45 and fixed within the aerodynamic structure, a substantially rigid movable member 46 linearly displaceable along an axis 50 relative to the magnets 44a, 44b, and a flexible diaphragm or bellows 48 sealingly attached to an interior wall of the aerodynamic surface 42 and to the movable member. The bellows 48 defines an inner chamber 51 therein. Axial displacement of the movable member 46 as indicated by arrow 52 alternately compresses and expands the bellows 48 to cause fluid to move in and out of the chamber 51 through an orifice 54 formed in the aerodynamic surface 42. The arrows 56 indicate fluid movement in the form of a jet stream out of the orifice 54.

The movable member 46 comprises a pair of rigid pistons 60a, 60b preferably in the form of flat circular disks that are spaced apart and connected by a rigid cross tube 62; the combination in the preferred embodiment resembling a spool-like structure. The pistons 60a, 60b may be other than circular, such as rectangular or hexagonal, but are flat and thin relative to the axis so that the movable member assumes the spool shape. The cross tube 62 extends along the axis 50 and through the central openings 64 in the permanent magnets 44a, 44b, with the rigid pistons 60a, 60b each being positioned to the outer side of and associated with a respective magnet. That is, each magnet 44a, 44b has a side facing toward and a side facing away from the other magnet, and the pistons 60a, 60b are positioned adjacent the sides facing away from the other magnet. The first piston 60a can be termed the outer piston due to its proximity to the outer aerodynamic surface 42, with the cross tube 62 desirably being oriented generally normal to the aerodynamic surface, and the second piston 60b therefore being termed the inner piston. A stacked assembly of the outer piston 60a, the first magnet 44a, the gap 45, the second magnet 44b, and the inner piston 60b is thus provided. The fixed positions of the permanent magnets 44a, 44b is maintained through the use of three or more tie rods 66 or other such spacer supports.

Each of the pistons 60a, 60b resiliently couples to a fixed structure with respect to the permanent magnets 44a, 44b through an elastic structure such as a pliable membrane 70a, 70b. For example, each of the tie rods 66 is shown secured with respect to the magnets 44a, 44b with a bolt 72 or other such fastener, which also secures the pliable membrane 70a, 70b. Each pliable membrane 70a, 70b elastically supports the respective piston 60a, 60b of the jet actuator 40, as more fully described below. The membranes 70a, 70b are desirably fabricated of a light-weight composite resin-impregnated fabric. Of course, other springs that elastically couple the pistons 60a, 60b to a fixed location within the aerodynamic structure may be used, especially with the provision of the bellows 48 which performs the compression chamber defining function. For example, other springs that can be used are made of stainless steel or plastic.

The jet actuator 40 includes a voice coil mechanism for driving the movable member 46 including a pair of electric coils 82a, 82b each rigidly attached to a side of one of the pistons 60a, 60b facing toward the adjacent magnet 44a, 44b, each magnet including a groove or cavity 80a, 80b for receiving an electric coil and permitting axial movement of the coil therein. More particularly, the cavity 80a, 80b in each of the permanent magnets 44a, 44b is formed as a relatively narrow annular or rectangular tube shape that opens in the side of the magnet facing the associated circular or rectangular rigid piston 60a, 60b. Each of the pistons 60a, 60b has a tubular (e.g., circular or rectangular) electric coil 82a, 82b rigidly attached thereto and projecting into the annular or rectangular cavity 80a, 80b of the associated magnet 44a, 44b. Each of the pistons 60a, 60b is resiliently spaced from its associated magnet 44a, 44b by the respective membranes 70a, 70b, with the tubular electric coils 82a, 82b substantially projecting within the annular cavity 80a, 80b. In a preferred embodiment, the annular cavities 80a, 80b extend more than halfway through the thickness of the magnets 44a, 44b, with the tubular electric coils 82a, 82b projecting into the cavities such that they are spaced from the bottom thereof a distance that is greater than the nominal spacing between the respective piston 60a or 60b and adjacent magnet 44a or 44b.

An electric circuit energized by an alternating current (AC) power source 84 is provided as part of the voice coil mechanism to drive the movable member 46 with respect to the permanent magnets 44a, 44b. The current passes to the electric coils 82a, 82b through conductors (or leads) located on the surface of the pliable membranes 70a, 70b facing the magnets 44a, 44b. Energizing the electric coils 82a, 82b creates an alternating electromagnetic flux that interacts with the permanent magnets 44a, 44b and axially displaces the coils within the cavities 80. Regulation of the alternating current from the power source 84 causes reciprocal linear motion of the coils 82, and displaces the movable member 46 along the axis 50. Area contact between the outer piston 60a and the bellows 48 compresses and expands the bellows to force fluid out of and into the orifice 54, respectively.

The present invention provides a more efficient voice coil structure from those previously disclosed. Specifically, the provision of the dual, spaced magnets 44a, 44b and dual pistons 60a, 60b and associated electric coils 82a, 82b increases the linear force available to compress and expand the bellows 48 relative to a single electric coil and magnet combination. Furthermore, by virtue of the dual pliable membranes 70a, 70b, the rigid spool-like member 46 is more reliably constrained to move along the axis 50, thus reducing misalignment losses. Moreover, the movable member 46 is desirably symmetric in terms of mass relative to a plane that extends perpendicularly to the axis 50 at the midpoint of the cross tube 62; for example, the rigid pistons 60a, 60b may have identical masses. At the same time, the moving structures are desirably lightweight and rigid, in comparison to the prior art, as will be described in more detail below.

Desirably, defining the compression chamber 51 by structure (i.e., the bellows 48) separate from that (i.e., the pliable membranes 70a, 70b) used to elastically couple the movable member 46 permits optimization of these resilient structures. That is, the prior art disclosed pliable diaphragms that perform the dual functions of a) coupling the moving portion of the voice coil within the aerodynamic structure, and b) defining the compression chamber. Whatever resilient structure is used to couple the moving portions of the voice coil to the fixed portions it must possess a minimum elastic stiffness so as to provide a restoring force urging the moving portion to its equilibrium position. On the other hand, the resilient structure defining the compression chamber need only be flexible and durable enough to withstand numerous cycles of compression and expansion. In a preferred embodiment, therefore, the pliable membranes 70a, 70b are made of composite resin-impregnated fabric, while the resilient bellows 48 are desirably made of the fiberglass cloth reinforced with a silicone resin. Of course, the present invention can be designed such that the bellows 48 provides some of the elastic restoring force to the rigid spool-like member 46, thus supplementing the pliable membranes 70a, 70b.

It should also be emphasized that certain aspects of the present invention may be utilized without the bellows 48, wherein the pliable membrane 70a attached to the outer piston 60a would thus seal around the orifice 54 to define the compression chamber 51. In this sense then, the term "flexible diaphragm" circumscribing the compression chamber 51 may be used to refer to either the bellows 48 or the pliable membrane 70a in the absence of the bellows.

A further improvement of the system of the present invention relative to the prior art is the material construction of the primary moving components. For example, the rigid pistons 60a, 60b are desirably constructed of a suitably stiff composite material (i.e., a matrix and a filler) having alternating solid and honeycomb laminates. One particular preferred matrix material is NOMEX, a nylon fiber understood to be the copolymer of meta-phenylenediamine and isophthaloyl chloride. In addition, the piston structure can be further stiffened through the use of graphite skins that have either a woven or unidirectional fiber orientation. In a preferred embodiment, at least two layers of unidirectional graphite skins are applied to a substrate of honeycombed NOMEX, the graphite skins being oriented along different axes. The resulting composite construction of the pistons 60a, 60b is extremely stiff while also being lightweight. The increased stiffness of the pistons minimizes elastic deflections and greatly improves jet actuator performance at higher operating frequencies.

The movable member 46 is further improved by the use of a composite material cross tube 62. In a preferred embodiment, the outer end of the cross tube 62 is glued to the inner face of the outer piston 60a, while the inner end is attached to the inner piston 60b using a light-weight composite washer 86 and a fastener (not shown).

In operation, the power source 84 supplies an alternating current at various frequencies and at amplitudes of between 0 and 30 (rms) volts. The electric circuit supplies this alternating current to the electric coils 82a, 82b which are alternately attracted and repelled with respect to the permanent magnets 44a, 44b, causing linear displacement of the movable member 46 along the axis 50. Outward displacement of the movable member 46 compresses the bellows 48 to force fluid from within the chamber 51 through the orifice 54. Inward displacement of the movable member 46 expands the bellows 48 and pulls fluid into the chamber 51. Repeated oscillations of the movable member 46 creates the synthetic jet stream 56. As indicated in U.S. Pat. No. 5,938,404, various sensors can be distributed about the aerodynamic structure to provide information to a control unit (not shown) that regulates the power supply 84. In addition, more than one orifice 54 per bellows 48 may be utilized, and multiple jet actuators 40 may be utilized in a single aerodynamic structure at various locations.

Figure 3A:
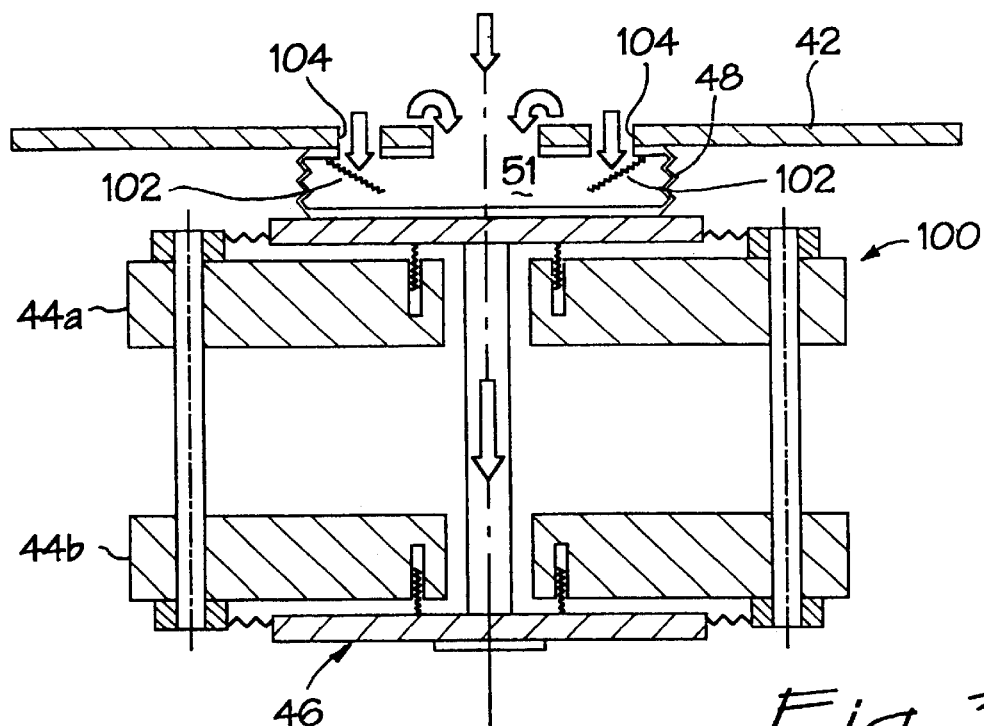
FIGS. 3a and 3b are sectional views through an alternative jet actuator of the present invention having improved air intake incorporated into an aerodynamic structure.
Figure 3B:
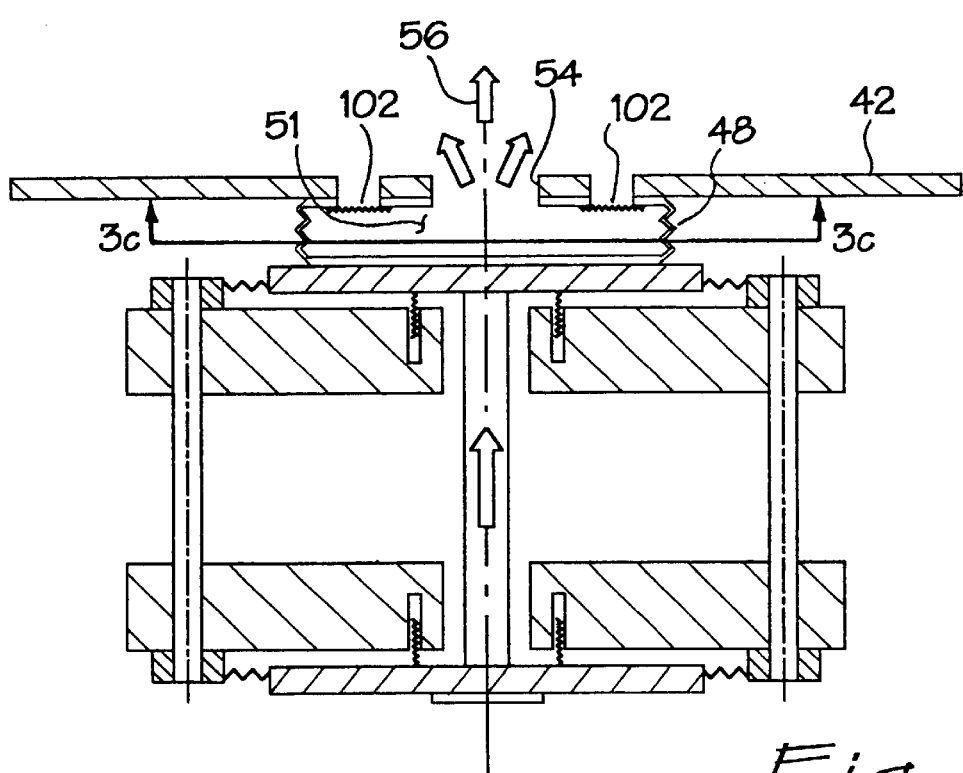
Figure 3C:
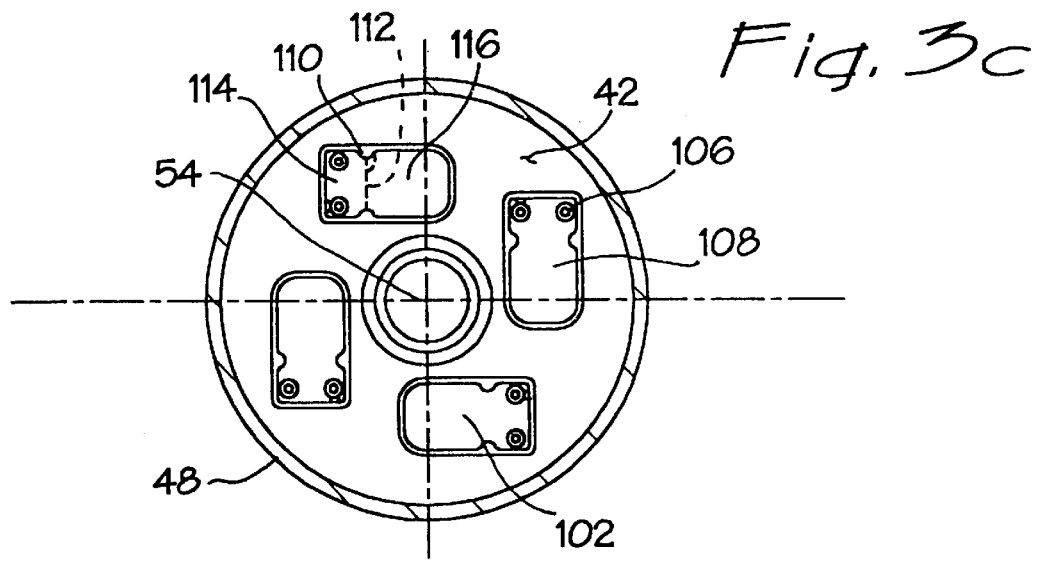
FIG. 3c is a plan view of an inner surface of the skin of the aerodynamic structure taken along line 3c—3c of FIG. 3b.

FIGS. 3a–3c illustrate an alternative jet actuator 100 with improved fluid intake. The structure of the actuator 100 is identical to that previously described with respect to FIG. 2, with the addition of at least one one-way valve 102, each covering an orifice 104 in the aerodynamic surface 42. The one-way valve(s) 102 permit fluid intake to the chamber 51 during the expansion cycle of the bellows 48.

As seen from the inside of the aerodynamic surface 42 in FIG. 3c, a plurality of one-way valves 102 are desirably evenly distributed about the central orifice 54. In one specific embodiment, each one-way valve comprises a thin, generally rectangular plate 108 that is fastened at one end into recessed grooves located in the aerodynamic surface 42, such as through the use of a pair of screws 106. A pair of outwardly directed notches 110 in the long sides of each of the plates 108 defines a bending axis 112 that separates the plate into an anchored portion 114 and a cantilevered portion 116. It will be appreciated that suction created within the chamber 51 bends the cantilevered portion 116 of each one-way valve 102 inward, thus permitting fluid intake through the respective orifice 104. Removal of the suction from chamber 51 causes the cantilevered portions 116 to resiliently straighten out and close the respective orifices 104. Such a structure, or its equivalent, may be termed a "flapper valve." Of course, various valves or other air intakes can be used in place of the disclosed one-way valves 102 to increase the fluid intake available for the system.

FIG. 3a illustrates the jet actuator 100 in its fluid intake cycle with the one-way valves 102 opened. A number of fluid flow arrows are shown indicating fluid intake into the chamber 51. FIG. 3b shows the opposite cycle of fluid expulsion from the chamber 51. In the fluid expulsion cycle, the one-way valves 102 are closed so that a controlled jet stream 56 exits only through the nozzle-like central orifice 54.

The plates 108 of the one-way valves 102 may be made of a variety of materials calibrated to the number and/or size required. For example, the plates 108 may be fabricated out of 0.005 inch thick stainless steel or from 0.003 inch thick light-weight graphite laminate. In a preferred embodiment, there are four one-way valves 102 evenly distributed about the orifice 54.

In an alternative configuration, the one-way valves may be provided at a location other than in the aerodynamic surface. For example, one or more one-way valves may be located in the outer piston such that fluid may be ingested through the piston upon expansion of the compression chamber, but fluid is prevented from being expelled through the piston. In this way, the orifice is the only opening through the aerodynamic surface. Whatever the location of the one-way valves, fluid can only be expelled through the orifice(s) in the aerodynamic surface so that a discrete and repeatable jet is produced. In this regard, the orifice may be nozzle-shaped or directed so as to produce a desired fluid flow pattern into the surrounding free stream.

Figure 4:
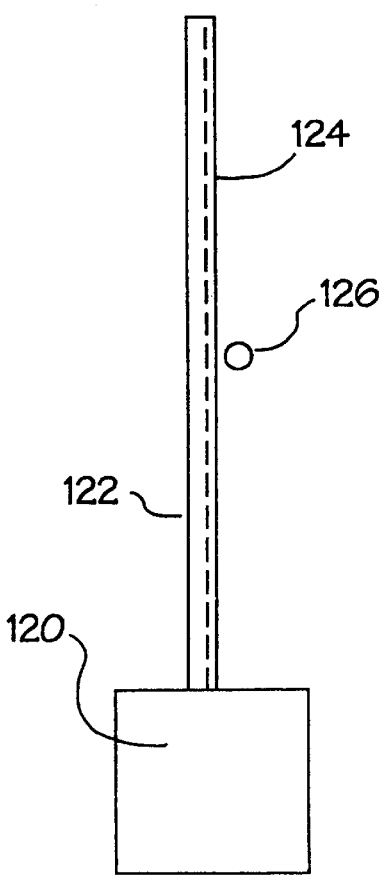
FIG. 4 is a schematic representation of an apparatus for testing synthetic jet actuators.

FIG. 4 schematically illustrates an apparatus for testing the jet actuators of the present invention, and of the prior art. In general, the performance of a jet actuator is quantified by the measured jet momentum (or, equivalently, the mean external velocity) a small distance away from the orifice-like exit port. In FIG. 4, an aerodynamic structure having the jet actuator is schematically indicated at 120. An elongated plenum 122 having a hollow rectangular cross-section is sealed to the orifice of the jet actuator. The plenum 122 includes a plurality of exit ports 124 distributed along its length from which fluid generated by the jet actuator is expelled. A Keel probe 126 attached to a digital manometer (not shown) is positioned close to one of the exit ports 124. As fluid is expelled through the exit port 124, the Keel probe 126 measures the pressure, which can be converted to velocity, and in turn momentum.

In a preferred embodiment, the plenum 122 is 8 inches long and 0.5 square inches in cross-section. The plenum 122 includes twenty-one 0.25 inch wide exit ports 124 distributed along its length. Each exit port 124 is angled to open at a relatively shallow angle with respect to the surface of the plenum 122, preferably about 5–25°. The Keel probe 126 is positioned a distance of about 0.03 inches away from the central exit port 124. Velocity measurements are taken at fixed power levels and various frequencies.

Figure 5:
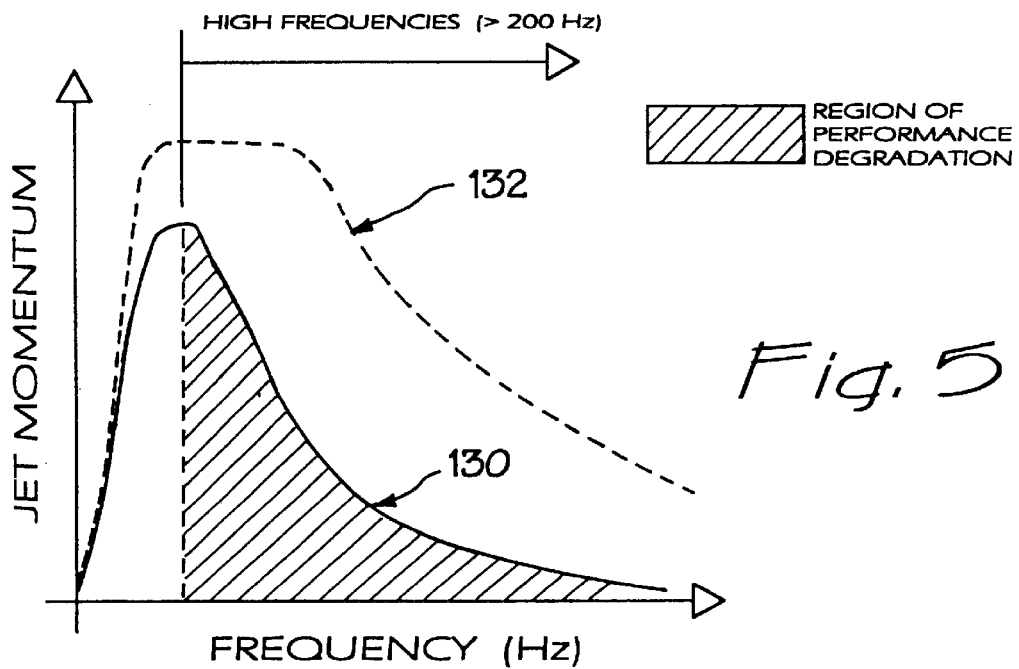
FIG. 5 is a generalized graphical representation of the output of synthetic jet actuators of the prior art and jet actuators of the present invention in relation to frequency.

FIG. 5 is a general graphical representation of the performance of the jet actuator of the present invention compared with a first generation Boeing synthetic jet actuator, such as shown in U.S. Pat. No. 5,938,404. The solid line curve 130 indicates the jet momentum of the prior art synthetic jet actuators at frequencies below and above 200 Hz. The dotted line 132 indicates the improved jet momentum performance using the jet actuators of the present invention. Prior art synthetic jet actuators experience rapid degradation in momentum output at oscillations frequencies above 200 Hz. It can be seen that in addition to improving the momentum output at higher frequencies, the jet actuators of the present invention also improve performance at frequencies lower than 200 Hz.

Figure 6A:
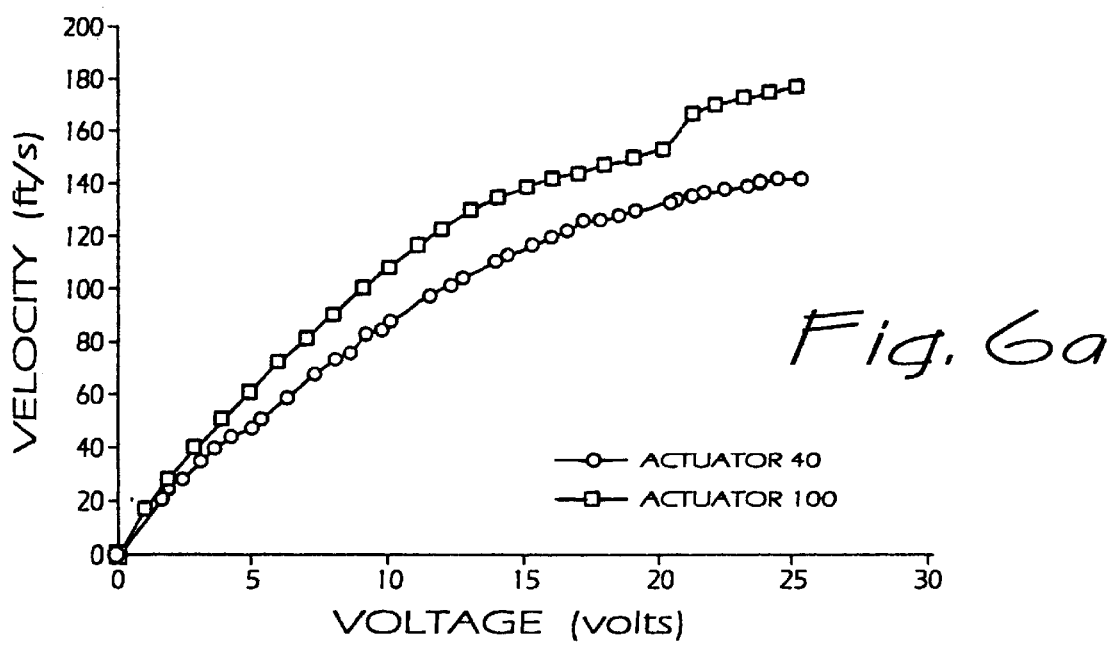
FIGS. 6a–6c are graphs of measured output performance of various jet actuators of the present invention in relation to both actuation voltage and operational frequency.
Figure 6B:
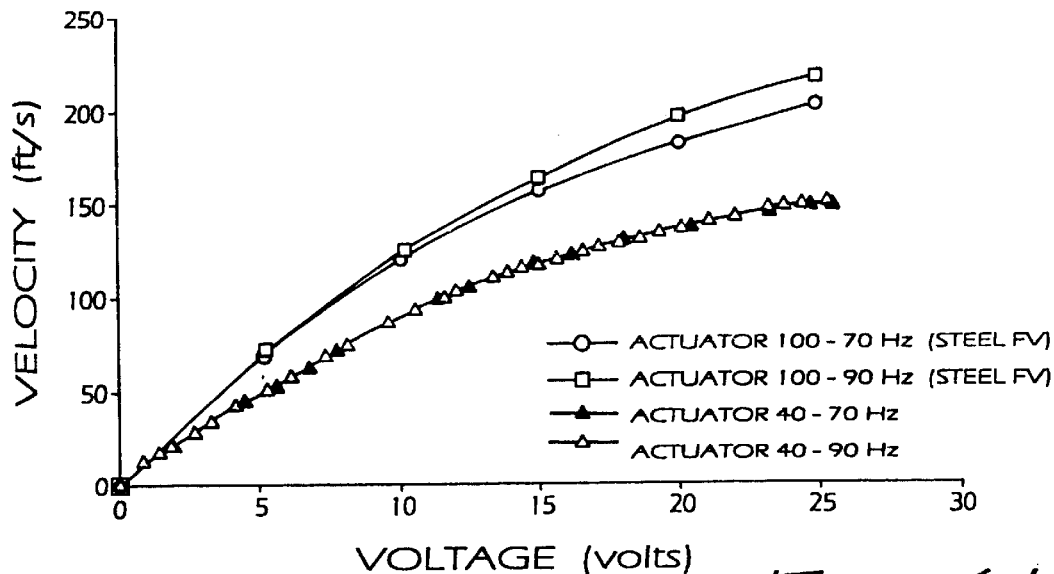
Figure 6C:
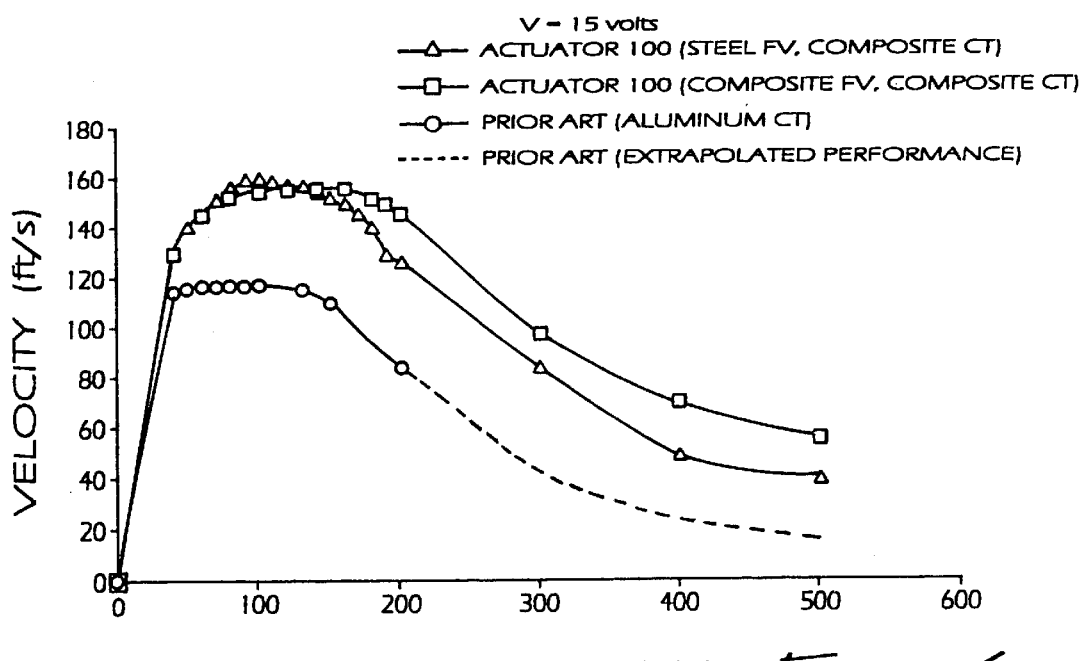

FIGS. 6a–6c are the results of a number of tests on jet actuators of the present invention at various voltages and frequencies. FIG. 6a indicates the output velocity using the jet actuator 40 of FIG. 2 and the jet actuator 100 of FIGS. 3a–3c at a frequency of 50 Hz and at increasing voltages. For this test, the one-way valves 102 were stainless steel flapper valves. It is thus apparent that the use of the one-way valves produces consistently better performance over the jet actuator of the present invention without such valves. For example, at 25 volts, there is a 25% improvement in performance using the one-way valves.

FIG. 6b is a similar graph of velocity versus voltage for two different jet actuators of the present invention, at two different frequencies. Namely, the upper curves represent the jet actuator 100 of FIGS. 3a–3c having stainless steel flapper valves, while the lower two curves are for the jet actuator 40 of FIG. 2 without the one-way valves. Both designs were tested at 70 and 90 Hz. Again, it can be seen that there is an improved velocity output using the one-way valves, and some improvement using the one-way valve embodiment at an increased frequency.

Finally, FIG. 6c compares the performance of two different jet actuators of the present invention utilizing different one-way valves with a synthetic jet actuator of the prior art. The curve having triangular data points corresponds to a jet actuator 100 of present invention having stainless steel flapper valves. The curve having square data points corresponds to a jet actuator 100 having composite flapper valves. A synthetic jet actuator of the prior art was tested up to a frequency of 200 Hz as indicated by the curve having circular data points, with the portion of the curve above 200 Hz being extrapolated, as shown by the dashed line. It can be seen that performance of the two jet actuators of the present invention having one-way valves is substantially equivalent at the lower frequencies, with the actuator having composite one-way valves providing greater velocity output at higher frequencies. Both of the actuators of the present invention exhibit superior performance over the synthetic jet actuator of the prior art.

While the foregoing is a complete description of the preferred embodiments of the invention, various alternatives, modifications, and equivalents may be used. Moreover, it will be obvious that certain other modifications may be practiced within the scope of the appended claims.

What is claimed is:

1. A jet actuator for control of an aerodynamic structure, comprising:

an aerodynamic structure having an aerodynamic surface and a hollow space adjacent the surface;

an orifice opening through the aerodynamic surface adjacent to the hollow space;

a substantially rigid movable member sized to fit within the hollow space, the movable member having a pair of pistons connected by an elongated cross element defining an axis, the movable member being substantially symmetric in terms of its mass about a plane extending perpendicularly through the mid-point of the cross element, the axis extending in a direction that intersects the aerodynamic surface substantially normally so that one of the pistons is an outer piston and the other is an inner piston, relative to the aerodynamic surface;

a pair of springs each coupling one of the pistons to one or more fixed points relative to the aerodynamic structure so as to define a point of equilibrium for the movable member along the axis;

a bellows within the hollow space and sealed around the orifice so as to define a compression chamber open to the exterior of the aerodynamic surface, the outer piston being attached to the bellows; and a voice coil mechanism within the hollow space arranged to drive the movable member in both directions from its point of equilibrium along the axis and cause the outer piston to alternately compress and expand the bellows, respectively expelling fluid from and pulling fluid into the compression chamber through the orifice.

2. The jet actuator of claim 1, wherein the pistons are flat and thin relative to the axis so that the movable member is in the shape of a spool.

3. The jet actuator of claim 1, wherein the movable member is made substantially entirely of composite materials.

4. The jet actuator of claim 3, wherein the outer piston comprises a layer of uni-directional graphite.

5. The jet actuator of claim 4, wherein the outer piston comprises a composite material having a honeycomb structure and a plurality of the layers of uni- directional graphite oriented along different axes.

6. The jet actuator of claim 1, wherein the springs each comprise a pliable membrane extending between the periphery of each of the pistons and a fixed location within the hollow space.

7. The jet actuator of claim 1, wherein the voice coil mechanism comprises a pair of spaced apart permanent magnets each having a through opening, the magnets thus each having a side facing the other magnet, and an opposite side facing away from the other magnet, wherein each of the pistons is located adjacent the side of one of the permanent magnets facing away from the other magnet with the cross element extending through the openings in the magnets.

8. The jet actuator of claim 7, wherein the voice coil mechanism further comprises:

a pair of electric coils each rigidly attached to a side of one of the pistons facing toward the adjacent magnet;

each magnet including a cavity opening to the side facing away from the other magnet for receiving the electric coil, the cavity being sized to permit axial movement of the associated electric coil therein; and an electric circuit including a power supply for energizing the electric coils and axially displacing them and the attached pistons in tandem.

9. The jet actuator of claim 1, further including a one-way valve opening to the compression chamber to permit fluid to be pulled therethrough into the compression chamber upon expansion of the bellows, but prevent fluid from being expelled therethrough from the chamber upon compression of the bellows.

10. The jet actuator of claim 9, wherein the one-way valve is located in the aerodynamic surface.

11. A jet actuator for control of an aerodynamic structure, comprising:

an aerodynamic structure having an aerodynamic surface and a hollow space adjacent to the surface;

an orifice opening through the aerodynamic surface adjacent to the hollow space;

a substantially rigid movable member sized to fit within the hollow space and arranged to move along an axis, the movable member having a piston, a flexible diaphragm within the hollow space and sealed around the orifice so as to define a compression chamber open to the exterior of the aerodynamic surface, the piston being attached to the flexible diaphragm such that movement of the piston along the axis alternately compresses and expands the chamber;

a voice coil mechanism within the hollow space arranged to drive the movable member along the axis and cause the piston to alternately compress and expand the compression chamber, respectively expelling fluid from and pulling fluid into the compression chamber through the orifice;

a power circuit for driving said movable member along said axis, wherein said flexible diaphragm does not form a part of said power circuit; and a one-way valve opening to the compression chamber to permit fluid to be pulled therethrough into the chamber upon expansion of the chamber, but prevent fluid from being expelled therethrough from the chamber upon compression of the chamber.

12. The jet actuator of claim 11, wherein the one-way valve is located in the aerodynamic surface.

13. The jet actuator of claim 11, wherein there are a plurality of one-way valves.

14. The jet actuator of claim 13, wherein the plurality of one-way valves are located in the aerodynamic structure surrounding the orifice.

15. The jet actuator of claim 11, wherein the one-way valve comprises a flapper valve.

16. The jet actuator of claim 15, wherein the flapper valve comprises a plate-like structure anchored along one edge and cantilevered over an opening to the compression chamber.

17. The jet actuator of claim 16, wherein the plate-like structure is made of a composite material.

18. The jet actuator of claim 16, wherein the plate-like structure is anchored within a recess formed on an inner face of the aerodynamic surface.

19. The jet actuator of claim 11, wherein said flexible diaphragm comprises a bellows.

20. The jet actuator of claim 11, wherein said diaphragm is constructed of a material having low electric conductivity.

21. The jet actuator of claim 20, wherein said diaphragm is constructed of fiberglass cloth reinforced with a silicone resin.

22. A jet actuator for control of an aerodynamic structure, comprising:
- an aerodynamic structure having an aerodynamic surface and a hollow space adjacent to the surface;
- an orifice opening through the aerodynamic surface adjacent to the hollow space;
- a substantially rigid movable member sized to fit within the hollow space and arranged to move along an axis, the movable member having a piston;
- a permanent magnet stacked in an array including said piston,
- a flexible diaphragm within the hollow space and sealed around the orifice so as to define a compression chamber open to the exterior of the aerodynamic surface, the piston being attached to the flexible diaphragm such that movement of the piston along the axis alternately compresses and expands the chamber;
- a voice coil mechanism within the hollow space arranged to drive the movable member along the axis and cause the piston to alternately compress and expand the compression chamber, respectively expelling fluid from and pulling fluid into the compression chamber through the orifice;
- a one-way valve opening to the compression chamber to permit fluid to be pulled therethrough into the chamber upon expansion of the chamber, but prevent fluid from being expelled therethrough from the chamber upon compression of the chamber; and
- pliable membranes for resiliently coupling said piston to a fixed structure, relative to said permanent magnet.

23. The jet actuator of claim 22, wherein said fixed structure comprises a tie rod.

* * * * *